United States Patent
Kobori

[19]
[11] Patent Number: 5,978,552
[45] Date of Patent: Nov. 2, 1999

[54] RULED LINE GENERATING APPARATUS AND SHEET FOR USE THEREIN

[75] Inventor: Masahiro Kobori, Tokyo, Japan

[73] Assignee: Sony Corporation, Tokyo, Japan

[21] Appl. No.: 07/981,207

[22] Filed: Nov. 25, 1992

[30] Foreign Application Priority Data

| Nov. 28, 1991 | [JP] | Japan | 3-315025 |
| Nov. 28, 1991 | [JP] | Japan | 3-315026 |
| Nov. 28, 1991 | [JP] | Japan | 3-315027 |
| Nov. 28, 1991 | [JP] | Japan | 3-315028 |

[51] Int. Cl.$^6$ ............................. G06K 15/00
[52] U.S. Cl. ............................. 395/106; 395/101
[58] Field of Search ............ 395/117, 101, 395/106; 346/76 PH, 154; 358/48, 202; 382/56; 283/57, 70, 115; 235/462; 400/76, 708

[56] References Cited

U.S. PATENT DOCUMENTS

| 4,349,741 | 9/1982 | Bobart et al. | 335/462 |
| 4,494,862 | 1/1985 | Tanaka | 358/48 |
| 4,862,194 | 8/1989 | Uematsu | 346/76 PH |
| 5,025,397 | 6/1991 | Suzuki | 395/117 |
| 5,060,980 | 10/1991 | Johnson et al. | 283/70 |
| 5,085,529 | 2/1992 | McGourty et al. | 400/76 |

FOREIGN PATENT DOCUMENTS

| 58-87084 | 5/1983 | Japan . |
| 58-102791 | 6/1983 | Japan . |
| 59-159387 | 9/1984 | Japan . |
| 3272882 | 4/1991 | Japan . |

*Primary Examiner*—Arthur G. Evans
*Attorney, Agent, or Firm*—Ronald P. Kananen; Rader, Fishman & Grauer

[57] ABSTRACT

An existing table may be read as table data by the position beam of a printer of a wordprocessor, a table may be read by an image input unit such as an image scanner, or may be created using a keyboard. The read or created table data is converted into code data which is stored in a memory. When the stored code data is subsequently read from the memory, the corresponding table can be displayed on an LCD unit, and the user can enter desired data in the displayed table. Thereafter, the entered data can be printed in cells of the table.

11 Claims, 12 Drawing Sheets

X – Axis Line Mark

Y – Axis Line Mark

RULED LINE GENERATING APPARATUS AND SHEET FOR USE THEREIN

BACKGROUND OF THE INVENTION

1. Field of the Invention

The present invention relates to a ruled line generating apparatus for use in a printer, a word processor with a printer, or the like, and a sheet for use in such a ruled sheet generating apparatus.

2. Description of the Prior Art

Printers are widely used for printing data from word processors, personal computers, or the like on sheets of paper.

Generally, the printers can be used in two different print modes. In one print mode, data generated and displayed on a display unit is simply printed on a blank sheet of paper by the printer. In the other print mode, a ruled sheet of paper with cells defined as a table by the lines thereon is set in the printer, and data generated and displayed on a display unit is printed in the cells by the printer while the printer carriage is moved under the control of a keyboard or the like so that the desired data can snugly fit in the cells.

The former print mode poses no substantial problem with respect to the positioning of the data on the blank sheet. In the latter print mode, however, it is difficult to position the data generated on the display unit properly in the desired cells on the ruled sheet, and the display unit is unable to display the table cells defined on the ruled sheet.

One solution is for the user to determine and set margins for respective print positions in those cells which are to contain desired data. However, the user will find it tedious and time-consuming to determine and set margins for respective print positions in the cells.

According to another solution, a table is generated on a display unit using a keyboard, or an existing table is read by an image reader, and the table data is stored in a floppy disk, a memory card, or other suitable storage medium. When it is necessary to print a table, the stored table data is read and displayed on the display unit, and desired data is typewritten in cells of the displayed table using the keyboard. Thereafter, the data and the table which are displayed on the display unit are printed on a sheet of paper by a printer. However, it is also cumbersome for the user to generate a table on the display unit with the keyboard or to read an existing table with the image reader. Particularly, if the image reader is used, the entire system required is comparatively expensive. Storing table data into the floppy disk, the memory card, or the like requires the user to handle the storage medium, which is however something extra and undesirable for the user who simply wants to print desired data in a table on a sheet of paper.

OBJECTS AND SUMMARY OF THE INVENTION

It is an object of the present invention to provide a code reading apparatus which is free of the aforesaid drawbacks.

Another object of the present invention is to provide a bar code converting apparatus which is free of the aforesaid drawbacks.

Still another object of the present invention is to provide a method of creating table information without the aforesaid drawbacks.

Yet another object of the present invention is to provide a coding apparatus which is free of the aforesaid drawbacks.

Yet still another object of the present invention is to provide a table information generating apparatus which is free of the aforesaid drawbacks.

A further object of the present invention is to provide a table sheet which is free of the aforesaid drawbacks.

A still further object of the present invention is to provide a word processor which is free of the aforesaid drawbacks.

According to the present invention, there is provided a code reading apparatus comprising a light-emitting element for applying light to a sheet to confirm a print starting position on the sheet and applying light to a code on the sheet, a light-detecting element for detecting light reflected from the code on the sheet, and means for reading the code based on the light detected by the light-detecting means.

The light emitted from the light-emitting element is applied to the code on the sheet, and the light reflected by the code is detected by the light-detecting element, so that the code can be read based on the light detected by the light-detecting element. In the case where the code reading apparatus is incorporated in a word processor with a printer, the coded information can be read by a simple arrangement, and various processing modes can be carried out based on the coded information thus read.

According to the present invention, there is also provided a bar code converting apparatus comprising reading means for reading table information on a sheet, and bar code converting means for converting the table information read by the reading means into a bar code.

The table information is read by the reading means, and converted into a bar code by the bar code converting means. Therefore, in the case where the bar code converting apparatus is incorporated in a word processor with a printer, the bar code indicative of the table information can be read by a simple arrangement. Desired data can be printed in cells of an existing table based on the bar code thus read. Table information of an existing table can also be converted into a bar code, and a printed table sheet can be produced based on the bar code converted from the table information.

According to the present invention, there is further provided a bar code converting apparatus comprising a scanner for reading table information on an existing table sheet, information and image memories for storing the table information read by the scanner, display means for displaying an image representing ruled line of the table information read from the image memory, bar code converting means for converting the table information read by the scanner into a bar code, and printing means for printing the bar code converted from the table information by the bar code converting means.

According to the present invention, there is also provided a method of creating table information, comprising the steps of setting a size of a sheet, moving reading means to a starting end of ruled line information printed on the sheet, starting to read the ruled line information with the reading means, scanning the reading means to read the ruled line information, storing the ruled line information read by the reading means in an information memory, and displaying the stored ruled line information on display means.

According to the present invention, there is also provided a bar code converting apparatus, comprising a keyboard for entering data, processing means for processing the data entered through the keyboard, display means for displaying the data processed by the processing means, and converting means for converting table information created on a display screen of the display means into a bar code.

The table information created on the display screen through the keyboard is converted into the bar code by the converting means. Therefore, in the case where the bar code converting apparatus is incorporated in a word processor with a printer, the bar code indicative of the table information can be read by a simple arrangement. Desired data can be printed in cells of an existing table based on the bar code thus read. Table information of an existing table can also be converted into a bar code, and a printed table sheet can be produced based on the bar code converted from the table information.

According to the present invention, there is further provided a coding apparatus comprising memory means for storing table information, detecting means for detecting positions and lengths of ruled lines in respective directions of the table information stored in the memory means, dividing means for dividing the table information based on the detected positions of the ruled lines, and converting means for coding information of the ruled lines based on the divided table information from the dividing means and the detected lengths from the detecting means.

The positions of the ruled lines are detected by the detecting means, the table information is divided by the dividing means based on the detected positions of the ruled lines, and the information of the ruled lines is coded based on the divided table information and the detected lengths. Therefore, the length of the coded information can be reduced, and the table information can be displayed or printed on various mediums by various output devices. For example, if a table and a code are printed on a sheet of paper, the table information can be read by reading the printed code, and the table information can be displayed on the screen of a display monitor. After desired data is entered in cells of the displayed table, the entered data can be printed in cells of a table on a sheet set in a printer.

According to the present invention, there is also provided a table information generating apparatus comprising memory means for storing table information, detecting means for detecting positions and lengths of ruled lines in respective directions of the table information stored in the memory means, dividing means for dividing the table information based on the detected positions of the ruled lines, converting means for coding information of the ruled lines based on the divided table information from the dividing means and the detected lengths from the detecting means and converting the coded information of the ruled lines into ruled line information of the ruled lines, and table information generating means for generating table information based on the ruled line information of the ruled lines from the converting means and the divided table information from the dividing means.

The positions of the ruled lines are detected by the detecting means, the table information is divided by the dividing means based on the detected positions of the ruled lines, and the information of the ruled lines is coded based on the divided table information and the detected lengths, and the coded information of the ruled lines is converted into ruled line information of the ruled lines. Then, table information is generated based on the ruled line information of the ruled lines from the converting means and the divided table information from the dividing means. If a table and a code are printed on a sheet of paper, for example, the table information can be read by reading the printed code, and the table information can be displayed on the screen of a display monitor. After desired data is entered in cells of the displayed table, the entered data can be printed in cells of a table on a sheet set in a printer.

According to the present invention, there is also provided a table sheet printed with a table and ruled line information which is produced by an apparatus comprising memory means for storing table information, detecting means for detecting positions and lengths of ruled lines in respective directions of the table information stored in the memory means, dividing means for dividing the table information based on the detected positions of the ruled lines, and converting means for coding information of the ruled lines into the ruled line information based on the divided table information from the dividing means and the detected lengths from the detecting means.

The positions of the ruled lines are detected by the detecting means, the table information is divided by the dividing means based on the detected positions of the ruled lines, and the information of the ruled lines is coded based on the divided table information and the detected lengths. The coded information of the ruled lines is printed, together with a table, on the table sheet. When the coded information printed on the table sheet is read, the table information can be read and displayed on the screen of a display monitor. After desired data is entered in cells of the displayed table, the entered data can be printed in cells of a table on a sheet set in a printer.

According to the present invention, there is also provided a word processor comprising a light-emitting element for applying light to a sheet to confirm a print starting position on the sheet and applying light to a code on the sheet, a light-detecting element for detecting light reflected from the code on the sheet, a recording head for printing data on the sheet, the light-emitting element and the light-detecting element being movable with the recording head, an image memory for storing table information indicative of ruled lines on a table sheet which are detected by the light-detecting means, display means for displaying an image representing the ruled line of the table information read from the image memory, input means for entering character information into the table information, and printing means for printing only the entered character information on the table sheet.

According to the present invention, there is also provided a word processor comprising a light-emitting element for applying light to a sheet to confirm a print starting position on the sheet and applying light to a code on the sheet, a light-detecting element for detecting light reflected from the code on the sheet, a recording head for printing data on the sheet, the light-emitting element and the light-detecting element being movable with the recording head, a bar code converter for reading a bar code printed on a table sheet with the light-detecting means and producing table information based on the read bar code, display means for displaying the table information produced by the bar code converter, input means for entering character information into the table information, and printing means for printing only the entered character information on the table sheet.

The above and other objects, features, and advantages of the present invention will become apparent from the following description of an illustrative embodiment thereof to be read in conjunction with the accompanying drawings, in which like reference numerals represent the same or similar objects.

DETAILED DESCRIPTION OF THE PREFERRED EMBODIMENT

Figure 1:
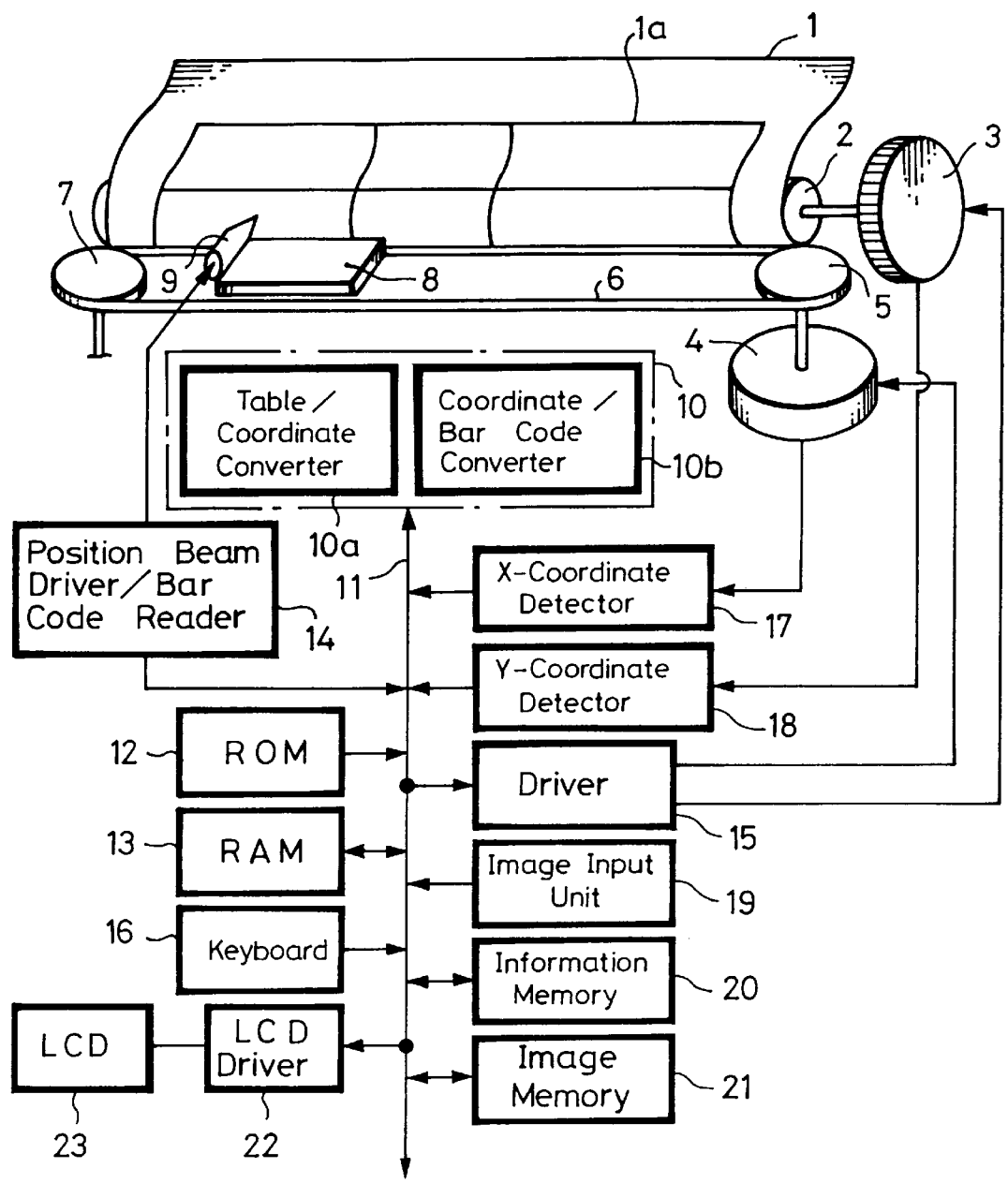
FIG. 1 is a block diagram, partly in perspective, of a word process r with a printer, which embodies the principles of the present invention.

As shown in FIG. 1, the principles of the present invention are incorporated in a ruled line generating apparatus which is illustrated as a word processor with a printer.

In FIG. 1, a table sheet 1 of paper with a table 1a printed thereon is guided by a guide roller 2 of rubber which can be rotated about its own axis by a Y-axis motor 3 whose output shaft is coaxially coupled to the shaft of the guide roller 2. When the motor 3 is energized, the guide roller 2 is rotated to feed the table sheet 1 in a Y-axis direction which is shown as an upward direction in FIG. 1.

A belt 6 is trained horizontally around a pair of horizontally spaced pulleys 5, 7 and extends along the guide roller 2 across the table sheet 1. The pulley 5 is coaxially connected to the output shaft of an X-axis motor 4, which, when energized, rotates the pulley 5 to cause the belt 6 to rotate the pulley 7 in the same direction as the pulley 5. To the belt 6, there are fixed a recording head and ribbon assembly 8 and a position beam 9 which move horizontally in an X-axis direction across the table sheet 1 on the guide roller 2 when the belt 6 is moved horizontally by the X-axis motor 4 through the pulleys 5, 7. The rubber roller 2, the Y-axis motor 3, the X-axis motor 4, the pulleys 5, 7, the belt 6, and the recording head and ribbon assembly 8 jointly serve as a serial printer of the word processor.

The position beam 9 has a light-emitting element and a light-detecting element, and can be actuated by a position beam driver/bar code reader 14. The position beam 9 has three functions to perform. The first function is to apply light from the light-emitting element to the table sheet 1 for the user to confirm a position where the table sheet 1 should start printing. The second function is to detect whether there is a ruled line on the table sheet 1 based on the light reflected from the table sheet 1, thereby obtaining table information. The third function is to detect ruled line information from a bar code printed on the table sheet 1, also based on the light reflected from the table sheet 1.

The word processor also includes a CPU 10 which has a table/coordinate converter 10a and a coordinate/bar code converter 10b as its functions. The CPU 10 is connected to various circuits (described below) through a bus 11 which includes an address bus, a data bus, and a control bus.

The bus 11 is connected to the position beam driver/bar code reader 14. The bus 11 is also connected to a ROM 12 which stores a program, a RAM 13 for temporarily storing various data, a driver 15 for energizing the Y-axis motor 3 and the X-axis motor 4, and a keyboard 16 for the user to enter input signals.

An X-coordinate detector 17, which is also connected to the bus 11, detects X coordinates on the table sheet 1 by counting either encoder pulses if the X-axis motor 4 has an encoder or drive pulses if the X-axis motor 4 is a stepping motor.

A Y-coordinate detector 18, which is also connected to the bus 11, detects Y coordinates on the table sheet 1 by counting either encoder pulses if the Y-axis motor 3 has an encoder or drive pulses if the Y-axis motor 3 is a stepping motor.

Figure 9:
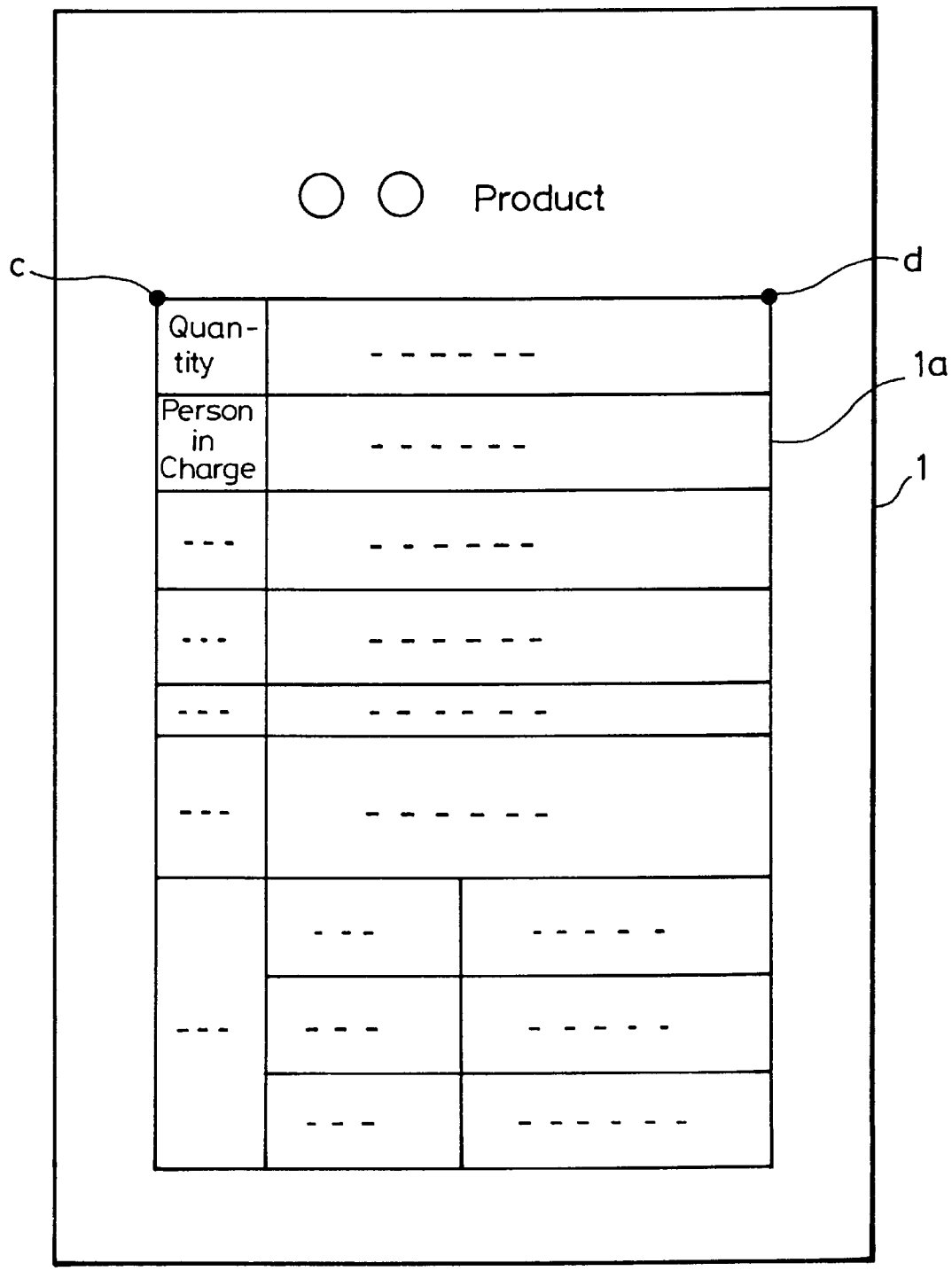
FIG. 9 is a view of an existing table sheet with a table printed thereon.

An image input unit 19 such as an image scanner or the like is also connected to the bus 11, and serves to read the information of a table 1a on a table sheet 1 as shown in FIG. 9.

An information memory 20, also connected to the bus 11, stores the information of the table 1a read by the image input unit 19, table information generated on a liquid crystal display (LCD) unit 23 with the keyboard 16 by the user, and the information of the table 1a read by the position beam driver/bar code reader 14 using the position beam 9.

An image memory 21, also connected to the bus 11, stores image information. The image information stored in the image memory 21 can be supplied through the bus 11 and an LCD driver 22 to the LCD unit 23 which displays the image information on its screen.

Now, various modes of operation of the word processor shown in FIG. 1 as the ruled line generating apparatus will be described below.

The modes of operation of the word processor as the ruled line generating apparatus include a mode for obtaining table information from an existing table sheet 1 such as a commercially available table sheet using the position beam 9, a mode for creating table information using the keyboard 16, a mode for reading the table information of a table sheet 1 as an image using the image input unit 19, a mode for converting the table information thus obtained into a code such as a bar code and printing the code in a predetermined position on a table sheet 1, and a mode for reading coded table information, such as a bar code, printed on a table sheet 1 and printing data between ruled lines or within cells based on the table information thus read.

The image input unit 19 may be a floppy disk driver, a memory card reader, or an electronic still camera to provide compatibility with various other image information devices.

The above modes of operation will be described in detail with reference to FIGS. 2 through 11.

Figure 2:
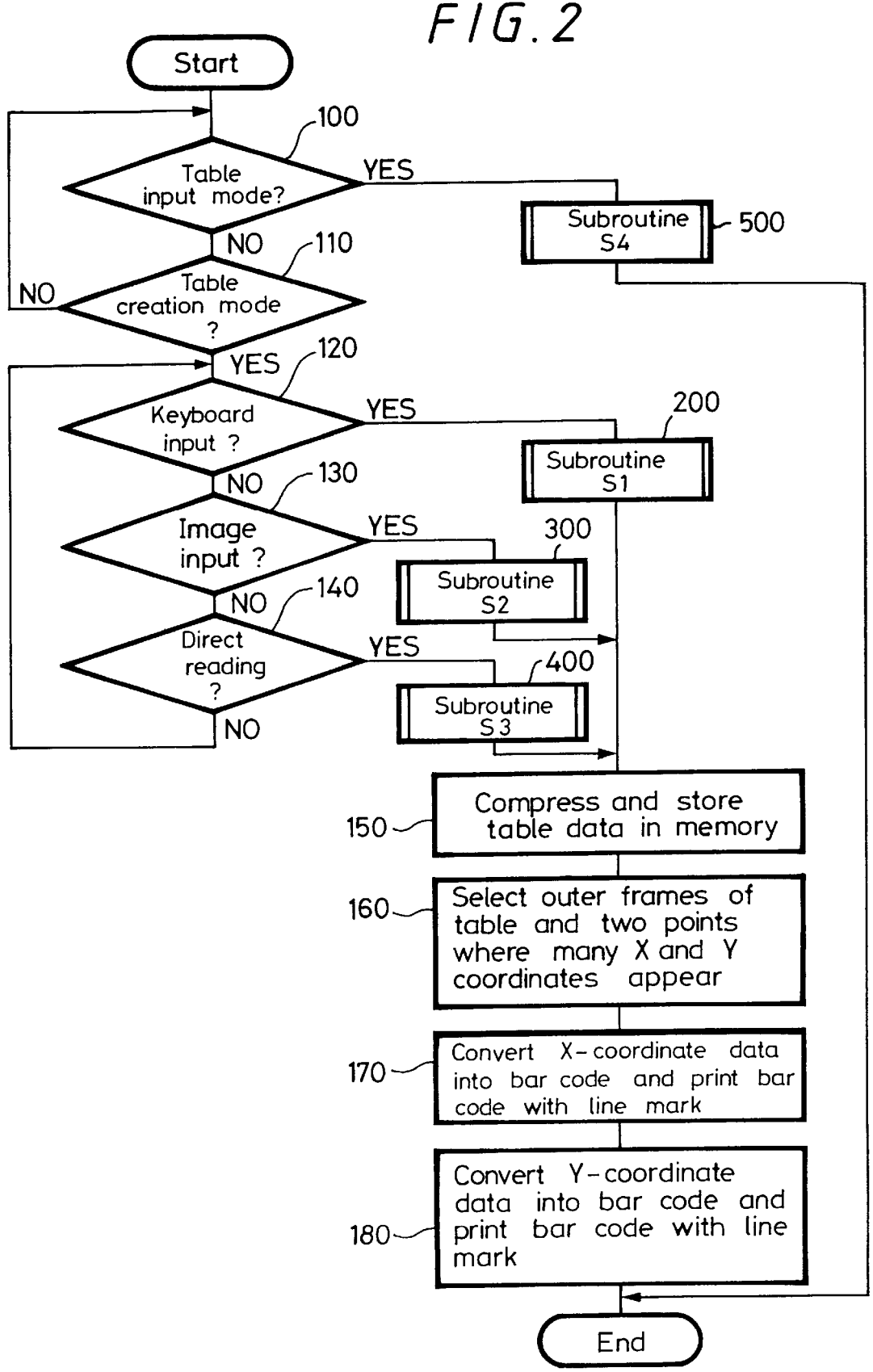
FIG. 2 is a flowchart of a main routine of an operation sequence of the word processor.

FIG. 2 shows a main routine of an operation sequence of the word processor as the ruled line generating apparatus, and FIGS. 3 through 6 show subroutines of the operation sequence. The main routine and the subroutines are executed by the CPU 10 according to the program stored in the ROM 12.

When the word processor shown in FIG. 1 is turned on, the LCD unit 23 displays a menu containing various word processing functions and also functions for performing the various modes of operation described above. Any of the displayed functions can manually be selected by the user through the keyboard 16.

First, the CPU 10 determines whether a table input mode in the menu on the LCD unit 23 is selected or not in a step 100. If selected, then control goes to a step 500, and if not, then control proceeds to a step 110.

In the step 500, the CPU 10 carries out a subroutine S4 (described later on). Thereafter, control goes to an end.

In the step 110, the CPU 10 determines whether a table creation mode in the menu on the LCD unit 23 is selected or not. If selected, then control goes to a step 120, and if not, then control goes back to the step 100.

In the step 120, the CPU 10 determines whether a keyboard input mode on the LCD unit 23 is selected or not. If selected, then control goes to a step 200, and if not, then control goes to a step 130.

In the step 200, the CPU 10 carries out a subroutine S1 (described later on). Thereafter, control goes to a step 150.

In the step 130, the CPU 10 determines whether an image input mode on the LCD unit 23 is selected or not. If selected, then control goes to a step 300, and if not, then control goes to a step 140.

In the step 300, the CPU 10 carries out a subroutine S2 (described later on). Thereafter, control goes to the step 150.

In the step 140, the CPU 10 determines whether a direct reading mode on the LCD unit 23 is selected or not. If selected, then control goes to a step 400, and if not, then control goes back to the step 120.

In the step 400, the CPU 10 carries out a subroutine S3 (described later on). Thereafter, control goes to the step 150.

Prior to describing the step 150 and following steps, the subroutines S1 through S3 will be described below.

First, the subroutine S1 will be described with reference to FIG. 3.

Figure 3:
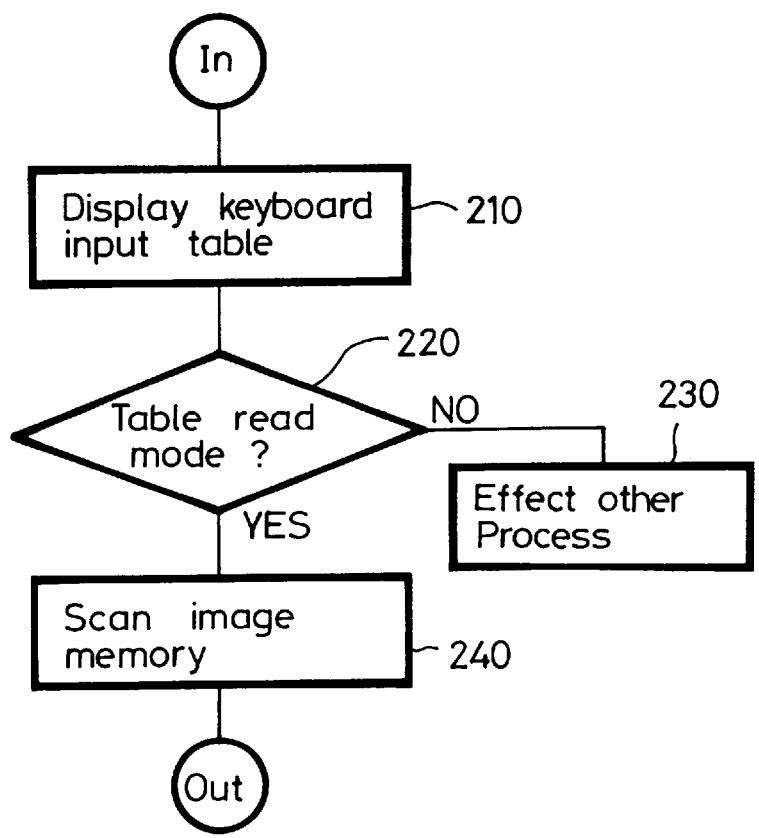
FIG. 3 is a flowchart of a subroutine of the operation sequence.

As shown in FIG. 3, the LCD unit 23 displays a table that has been inputted through the keyboard 16 in a step 210. More specifically, the user creates a table on the LCD unit 23 through the keyboard 16 according to a word processor function. The table data is stored in the image memory 21. The stored table data is then read from the image memory 21, and supplied through the bus 11 and the LCD driver 22 to the LCD unit 23, which displays the created table on its screen.

After the step 210, the CPU 10 determines whether a table read mode is selected or not in a step 220. If selected, then control proceeds to a step 240, and if not, then control goes to a step 230.

In the step 230, the CPU 10 effects another process. In the step 240, the CPU 10 scans the stored table data image memory 21, and stores the table data from the image memory 21 into the information memory 20. Thereafter, control returns from the subroutine S1 to the main routine shown in FIG. 2.

The subroutine S2 will be described with reference to FIG. 4.

Figure 4:
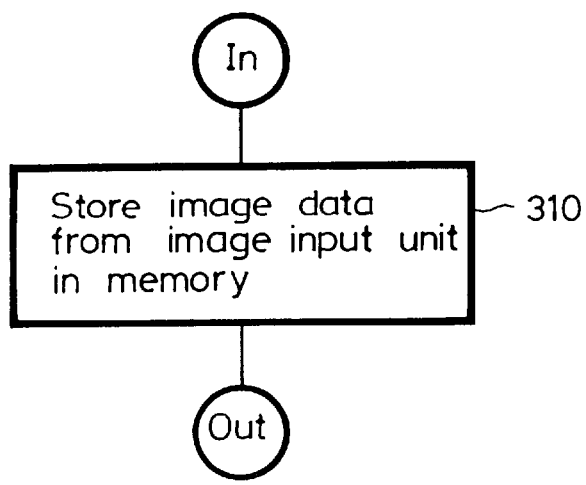
FIG. 4 is a flowchart of another subroutine of the operation sequence.

As shown in FIG. 4, the image input unit 19 such as an image scanner reads a table 1a on an existing table sheet 1 as shown in FIG. 9, for example, and the table data is stored in the information memory 20 and the image memory 21 in a step 310. The LCD unit 23 displays the table 1a as shown in FIG. 9 as an image on its screen. Thereafter, control returns from the subroutine S2 to the main routine shown in FIG. 2.

Figure 5:
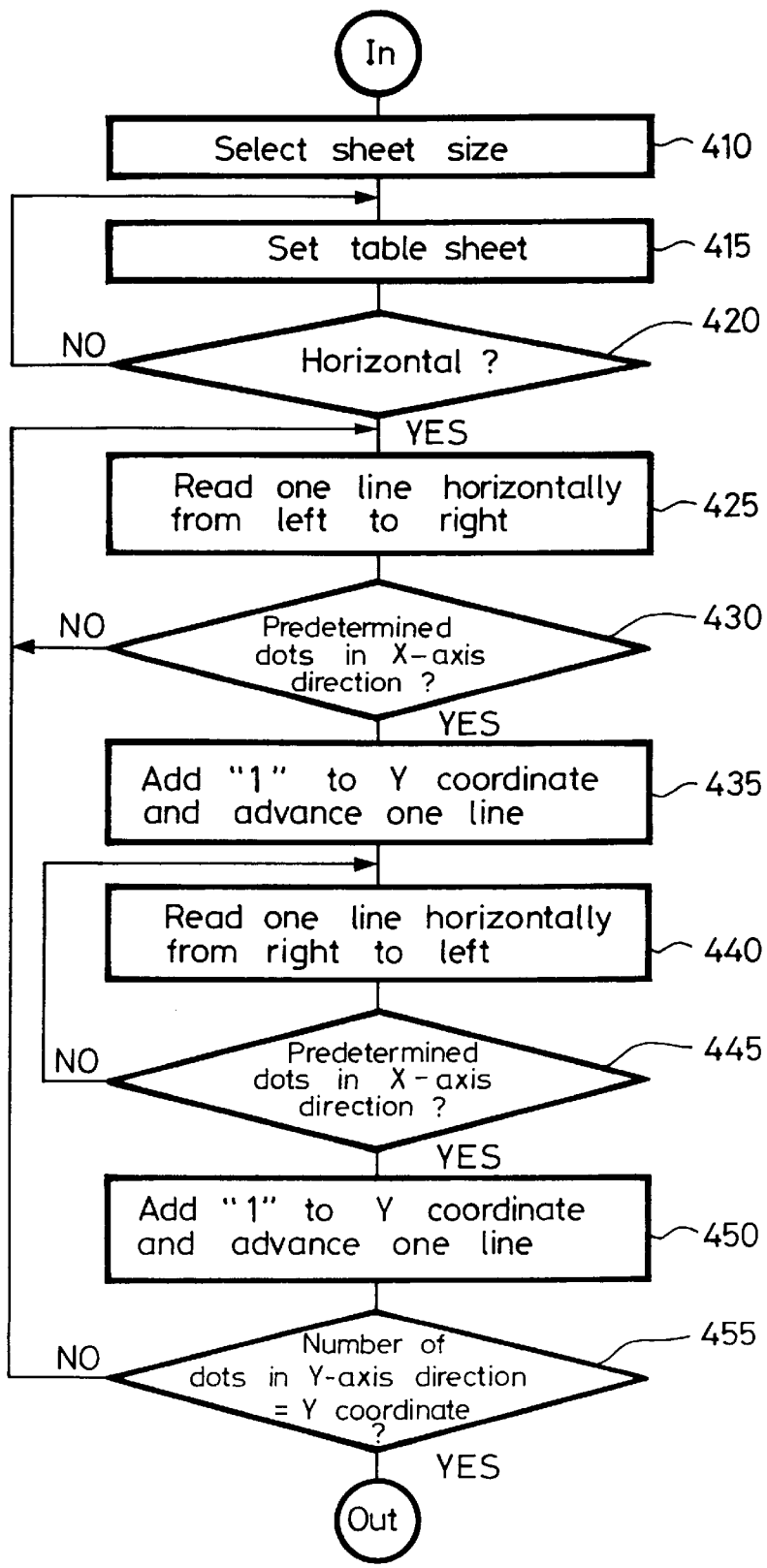
FIG. 5 is a flowchart of still another subroutine of the operation sequence.

The subroutine S3 will be described with reference to FIG. 5.

In the subroutine S3, an existing table sheet 1 as shown in FIG. 9 is set in the printer, and the information of the table 1a on the table sheet 1 is read by the position beam 9 and the position beam driver/bar code reader 14.

More specifically, the size of the table sheet 1 is selected in a step 410. For example, the user specifies the size, e.g., size A4, size B5, or other size, of the table sheet 1 through the keyboard 16. Then, the user sets the table sheet 1 in the printer in a step 415. More specifically, the table sheet 1 as shown in FIG. 9 is inserted in the printer. Then, the user presses a Y-axis key (not shown) on the keyboard 16 to enable the driver 15 to energize the Y-axis motor 3 to rotate the rubber roller 2, and also presses an X-axis key (not shown) on the keyboard 16 to enable the driver 15 to energize the X-axis motor 4 to rotate the pulley 5 for thereby moving the position beam 9 until the spot on the table sheet 1 of the position beam 9 is aligned with a lefthand starting point c of a ruled line on the table 1a as shown in FIG. 9. Thereafter, the X-axis key on the keyboard 16 is pressed again to enable the driver 15 to energize the X-axis motor 4 to rotate the pulley 5 for moving the position beam 9 until the spot thereof is aligned with a righthand ending point d of the ruled line on the table 1a as shown in FIG. 9.

Then, the CPU 10 determines whether the table sheet 1 is horizontal or not in a step 420. If horizontal, then control proceeds to a step 425. If not, then control goes back to the step 415. Specifically, if the spot of the position beam 9 is not aligned with the righthand ending point d, indicating that the table sheet 1 is not horizontal, then the CPU 10 controls the LCD unit 23 to display an error message indicating that the table sheet 1 is not set horizontally.

In the step 425, one line on the table sheet 1 is read horizontally from the left to the right. Specifically, the CPU 10 enables the driver 15 to energize the X-axis motor 4 to move the position beam 9 until the spot of the position beam 9 is aligned with the lefthand starting point c. Then, the position beam 9 is manually or automatically moved from the position c to the right. Upward and downward cursor keys (not shown) on the keyboard 16 are used to rotate the rubber roller 2, and leftward and rightward cursor keys (not shown) on the keyboard 16 are used to move the position beam 9. To manually move the position beam 9, therefore, the leftward and rightward cursor keys on the keyboard 16 are pressed by the user.

When the position beam 9 traces a ruled line on its movement to the right, it supplies a signal of low level "0" to the position beam driver/bar code reader 14. When the position beam 9 traces no ruled line, it supplies a signal of high level "1" to the position beam driver/bar code reader 14. The ruled line information indicated by the signal of low level "0" or high level "1" is then sent from the position beam driver/bar code reader 14 to the information memory 20 and stored therein. At the same time that the position beam 9 scans the table sheet 1 to the right along one line, the X-coordinate detector 17 counts pulses from the X-axis motor 4 to produce X-coordinate data, which is stored in the RAM 13.

Subsequently, the CPU 10 determines in a step 430 whether a predetermined number of dots have been reached in the X-axis direction based on the X-coordinate data stored in the RAM 13. If the predetermined number of dots have been reached in the X-axis direction, then control proceeds to a step 435. If not, then control returns to the step 425.

In the step 435, the CPU 10 increments Y-coordinate data by "1", and advances the table sheet 1 one line in the Y-axis direction. That is, the CPU 10 controls the driver 15 to energize the Y-axis motor 3 to rotate the rubber roller 2 one step, e.g., one dot, for feeding the table sheet 1 one line. The new Y-coordinate data is stored in the RAM 13. Concurrent with this, the Y-coordinate detector 18 counts pulses from the Y-axis motor 3 to produce Y-coordinate data, which is stored in the RAM 13.

Thereafter, one line on the table sheet 1 is read horizontally from the right to the left in a step 440. Specifically, the CPU 10 controls the driver 15 to energize the X-axis motor 4 to move the position beam 9 until the spot of the position beam 9 is aligned with the righthand ending point d (FIG. 9). Then, the position beam 9 is manually or automatically moved from the position d to the left.

When the position beam 9 traces a ruled line on its movement to the left, it supplies a signal of low level "0" to the position beam driver/bar code reader 14. When the position beam 9 traces no ruled line, it supplies a signal of high level "1" to the position beam driver/bar code reader 14. The ruled line information indicated by the signal of low level "0" or high level "1" is then sent from the position beam driver/bar code reader 14 to the information memory 20 and stored therein. At the same time that the position beam 9 scans the table sheet 1 to the left along one line, the X-coordinate detector 17 counts pulses from the X-axis motor 4 to produce X-coordinate data, which is stored in the RAM 13.

Subsequently, the CPU 10 determines in a step 445 whether a predetermined number of dots have been reached in the X-axis direction based on the X-coordinate data stored in the RAM 13. If the predetermined number of dots have been reached in the X-axis direction, then control proceeds to a step 450. If not, then control returns to the step 440.

In the step 450, the CPU 10 increments Y-coordinate data by "1", and advances the table sheet 1 one line in the Y-axis direction. That is, the CPU 10 controls the driver 15 to energize the Y-axis motor 3 to rotate the rubber roller 2 one step, e.g., one dot, for feeding the table sheet 1 one line. The new Y-coordinate data is stored in the RAM 13. Concurrent with this, the Y-coordinate detector 18 counts pulses from the Y-axis motor 3 to produce Y-coordinate data, which is stored in the RAM 13.

Figure 11:
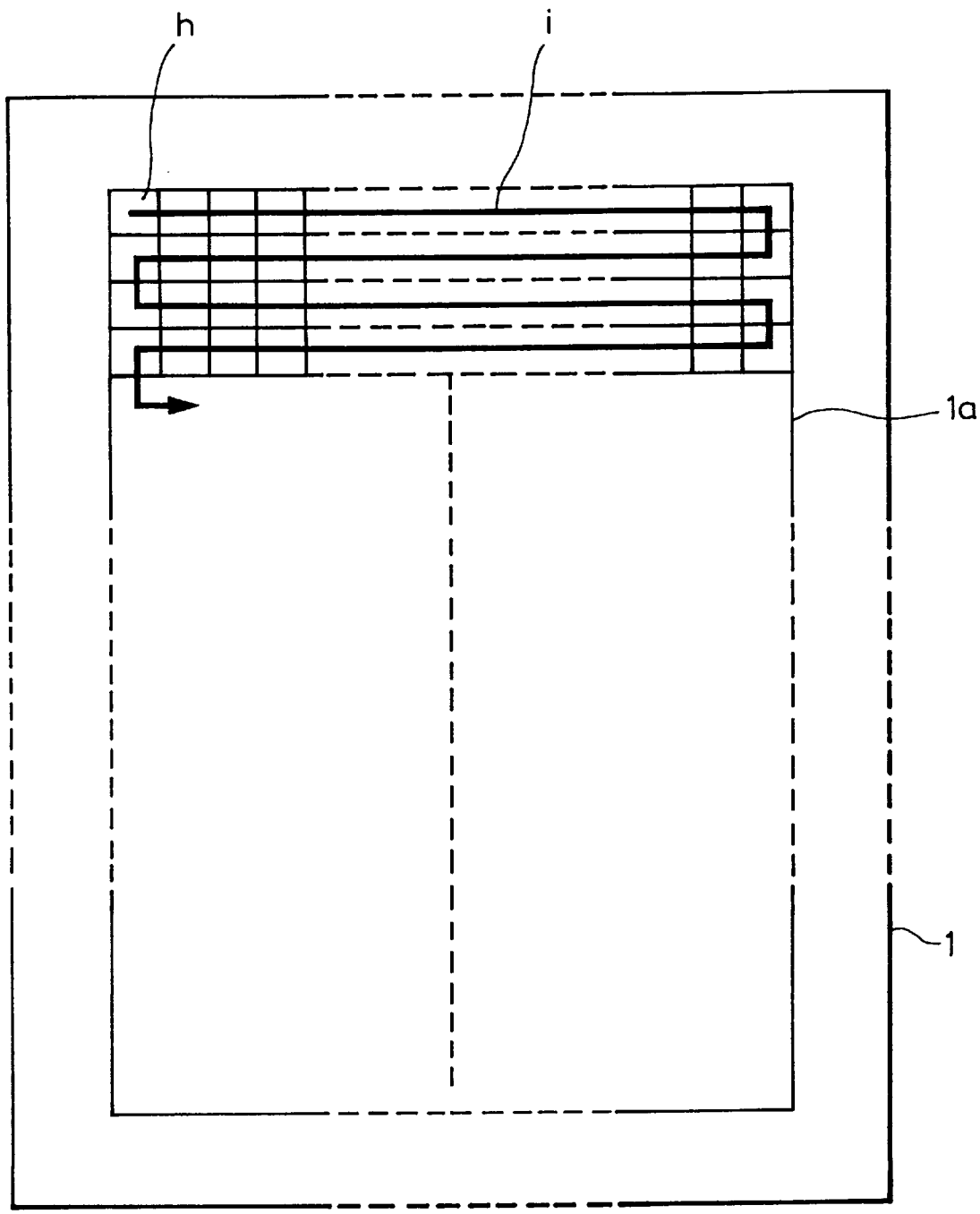
FIG. 11 is a view showing the manner in which table information is read.

The step 450 is followed by a step 455 in which the CPU 10 determines whether a predetermined number of dots in the Y-axis direction agrees with the Y-coordinate data or not. If yes, then control leaves the subroutine S3 and goes back to the main routine. If not, then control goes back to the step 425. Thereafter, ruled lines of the table 1a on the table sheet 1 are scanned successively in increments of a dot h by the position beam 9 that moves in X-axis directions i as shown in FIG. 11, so that the ruled line information of the table 1a can be obtained.

The table data thus read is converted into coordinate information by the table/coordinate converter 10a of the CPU 10.

After the subroutines S1, S2, S3, control proceeds to the step 150 of the main routine shown in FIG. 2.

The ruled line information that has been produced in the subroutines S1, S2, S3 is converted into a bar code, and the bar code is printed in an upper region of the table sheet 1. The printed bar code will subsequently be used as follows: the printed bar code on the table sheet 1 which is set in the printer is read by the position beam driver/bar code reader 14 through the position beam 9, and converted back into the original ruled line information. The converted ruled line information is then displayed as a table image on the LCD unit 23. Using the keyboard 16, the user then inputs desired data in cells defined by the ruled lines of the table image displayed on the LCD unit 23. Thereafter, the inputted data can be printed in the cells of the table 1a on the table sheet 1 set in the printer.

Figure 10:
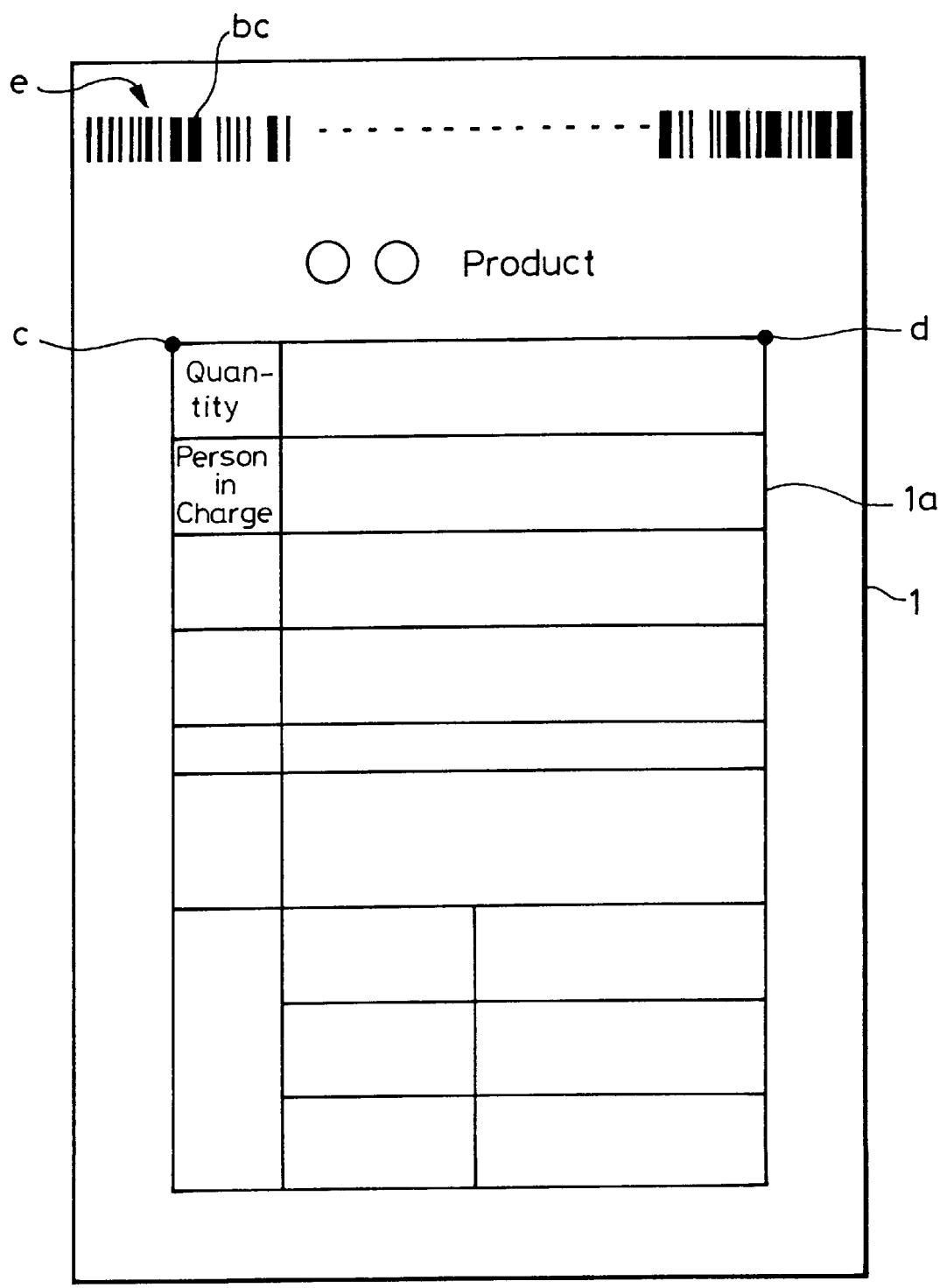
FIG. 10 is a view of a table sheet with a table printed thereon by the ruled line generating apparatus according to the present intention.

FIG. 10 shows, by way of example, a table sheet 1 printed with a bar code which represents the ruled line information of a table 1a on the table sheet 1. Since the ruled line information of the table 1a is printed as a bar code bc in a bar code area e, when table sheet 1 is set in the printer and the bar code bc is read by the position beam driver/bar code reader 14 through the position beam 9, the ruled line information can be displayed on the LCD unit 23. Therefore, the user is not required to determine and manually set margins for respective print positions in the cells of the table 1a, and desired data inputted by the user can be printed snugly in the cells of the table 1a.

In order to accurately read the bar code bc and print desired data accurately in the cells of the table 1a, after the spot of the position beam 9 is aligned with the lefthand starting point c of the table 1a, the user may press a return key (not shown) on the keyboard 16 to cause the position beam 9 to move automatically in unison with the recording head and ribbon assembly 8 for confirming whether there is a ruled line from the point c to the point d as shown in FIG. 10.

To manually move the position beam 9, after the spot of the position beam 9 is aligned with the lefthand starting point c of the table 1a, the user may press the X-axis key on the keyboard 16 to move the position beam 9 to the righthand ending point d for detecting whether a ruled line is continuously present or not.

The ruled information along the X- and Y-axes, as simply converted into the bar code bc which is printed, contains other information than the ruled lines. Therefore, the bar code bc contains a large amount of information as shown in FIG. 10.

According to this embodiment, the ruled line information is not simply converted into a bar code, but the ruled line information containing information other than the ruled lines is compressed and the compressed information is converted into a bar code.

Specifically, the table 1 is divided into a plurality of regions, and the ruled line information contained in each of the regions is converted into a bar code, with only information relative to ruled lines in X- and Y-axis directions being additionally obtained from each of the regions.

Such a process is carried out in the steps 150, 160, 170, and 180 of the main routine shown in FIG. 2. These steps 150, 160, 170, and 180 will be described below.

In the step 150, the CPU 10 compresses the table data and stores the compressed table data in memory.

In the step 160, the CPU 10 selects an outer frame of the table and two points where many X and Y coordinates appear. The selection of such an outer frame and two points in the step 160 will be described below with reference to FIGS. 7A and 7B.

Figure 7A:
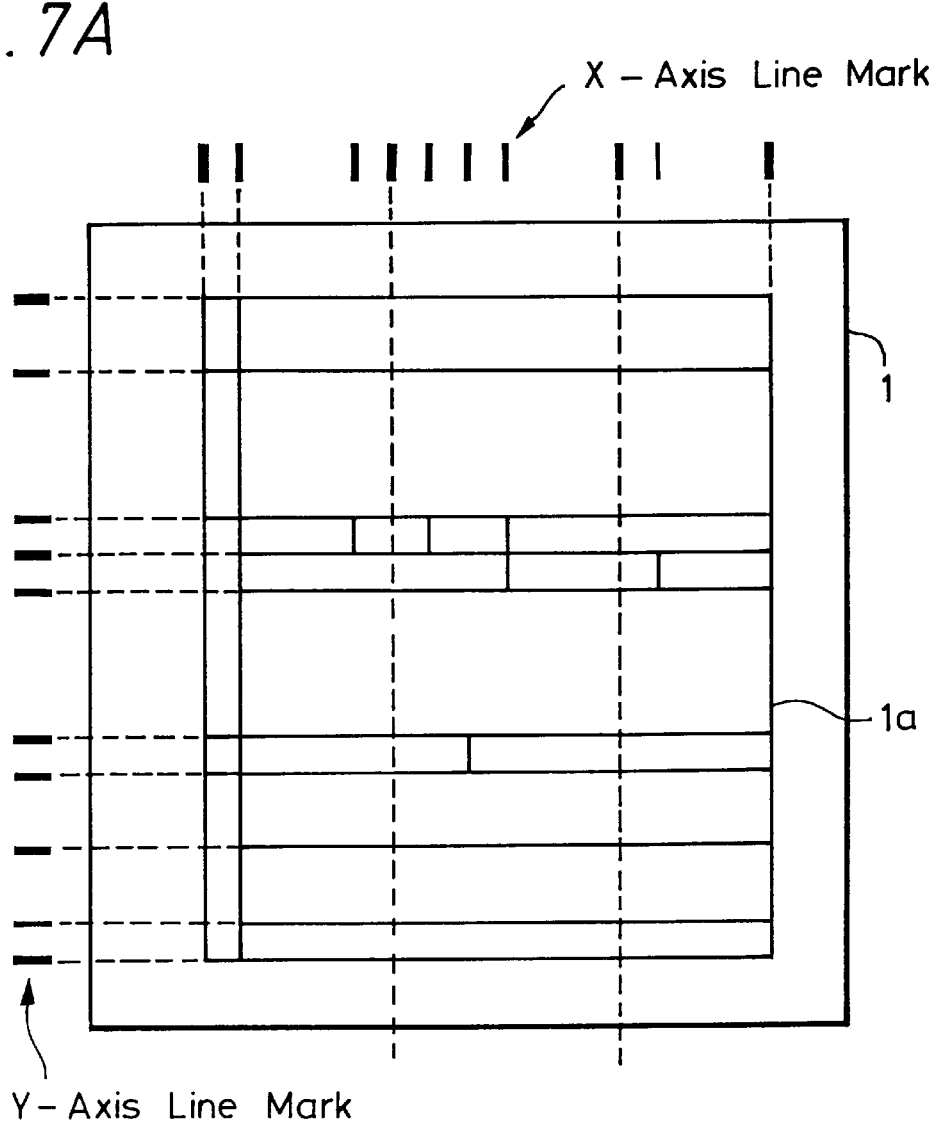
FIG. 7A is a view of a table sheet with a table printed thereon, the view also showing line marks.

FIG. 7A shows a table sheet 1 printed with a table 1a, and also shows line marks indicative of lines along the X- and Y-axes in the table 1a.

First, as shown in an area above the table 1a in FIG. 7A, only vertical ruled line information of the table 1a is extracted. The line marks representing the outer frame of the table 1a, i.e., the leftmost and rightmost vertical ruled lines of the table 1a, and the line marks representing those vertical ruled lines where many X coordinates appear are made thicker than the line marks representing the other vertical ruled lines.

Then, as shown in an area leftward of the table 1a in FIG. 7A, only horizontal ruled line information of the table 1a is extracted. The line marks representing the outer frame of the table 1a, i.e., the uppermost and lowermost horizontal ruled lines of the table 1a, and the line marks representing those horizontal ruled lines where many Y coordinates appear are made thicker than the line marks representing the other horizontal ruled lines.

The information of the line marks made thicker than the other line marks is stored in the RAM 13.

Figure 7B:
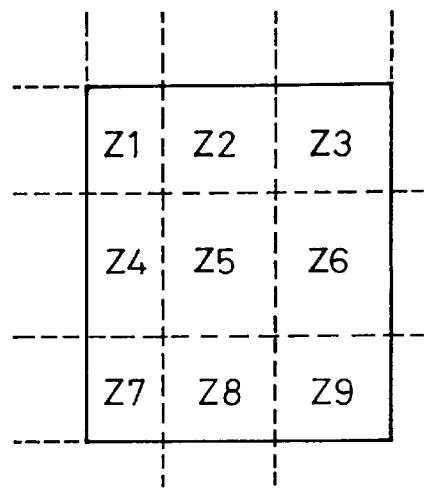
FIG. 7B is a view of the table divided into a plurality of regions.

The table 1a is now divided into a plurality of regions Z1 through Z9 by the thicker line marks as shown in FIG. 7B.

In the step 170 which follows the step 160, the CPU 10 converts the X-coordinate data, i.e., the line marks made thicker in the step 160, into a bar code, and prints the bar code with the line marks in a predetermined position on the sheet 1.

In the step 180, the CPU 10 converts the Y-coordinate data, i.e., the line marks made thicker in the step 160, into a bar code, and prints the bar code with the line marks in a predetermined position on the sheet 1.

The X- and Y-coordinate data can be converted into the bar codes by the coordinate/bar code converter 10b of the CPU 10.

That is, the X-coordinate data representing the line marks made thicker in the step 160 is compressed. Specifically, the X-coordinate data is compressed according to the following description:

The region Z1 extends in the X-axis direction from the first thicker line mark to the second thicker line mark as counted from the leftmost edge of the table 1a, and in the Y-axis direction from the first thicker line mark to the second thicker line mark as counted from the uppermost edge of the table 1a. The region Z1 contains four line marks indicative of X coordinates and four line marks indicative of Y coordinates.

At the uppermost line mark indicative of a Y coordinate (which has a smallest value in the region Z1), a ruled line extends fully in the region Z1 in the X-axis direction. The ruled line along the X axis at the Y coordinate indicated by the uppermost line mark is represented by "14" where "1" indicates the leftmost line mark (X coordinate) at the uppermost line mark (Y coordinate) and "4" indicates that the ruled line is drawn from the leftmost line mark to the fourth line mark (X coordinate).

At the second line mark, as counted from the uppermost line mark, indicative of a Y coordinate (which has a second smallest value in the region Z1), a ruled line extends fully from the leftmost line mark to the rightmost line mark in the region Z1 in the X-axis direction. The ruled line along the X axis at the Y coordinate indicated by the second line mark is also represented by "14."

At the third line mark, as counted from the uppermost line mark, indicative of a Y coordinate (which has a third smallest value in the region Z1), a ruled line extends also fully from the leftmost line mark to the rightmost line mark in the region Z1 in the X-axis direction. Therefore, the ruled line along the X axis at the Y coordinate indicated by the third line mark is also represented by "14."

At the fourth line mark, as counted from the uppermost line mark, indicative of a Y coordinate (which has a fourth smallest value in the region Z1), a ruled line extends from the second line mark, as counted from the leftmost line mark, to the rightmost line mark in the region Z1 in the X-axis direction. Therefore, the ruled line along the X axis at the Y coordinate indicated by the fourth line mark is represented by "24."

The ruled line information along the X axis in the region Z1 is thus represented by "14, 14, 14, 24."

The Y-coordinate data in the region Z1 which represents the line marks made thicker in the step 160 is compressed according to the following description.

At the leftmost line mark indicative of an X coordinate (which has a smallest value in the region Z1), a ruled line extends fully from the uppermost line mark to the fourth (lowermost) line mark in the region Z1 in the Y-axis direction. The ruled line along the Y axis at the X coordinate indicated by the leftmost line mark is represented by "14."

At the second line mark, as counted from the leftmost line mark, indicative of an X coordinate (which has a second smallest value in the region Z1), a ruled line extends fully from the uppermost line mark to the fourth (lowermost) line mark in the region Z1 in the Y-axis direction. The ruled line along the Y axis at the X coordinate indicated by the second line mark is also represented by "14."

At the third line mark, as counted from the leftmost line mark, indicative of an X coordinate (which has a third smallest value in the region Z1), a ruled line extends from the third line mark, as counted from the uppermost line mark, to the fourth (lowermost) line mark in the region Z1 in the Y-axis direction. Therefore, the ruled line along the Y axis at the X coordinate indicated by the third line mark is represented by "34."

At the fourth line mark, as counted from the leftmost line mark, indicative of an X coordinate (which has a fourth smallest value in the region Z1), no ruled line whatsoever is drawn from the uppermost line mark to the fourth (lowermost) line mark in the region Z1 in the Y-axis direction. Therefore, the ruled line information along the Y axis at the X coordinate indicated by the fourth line mark is represented by "00", "11,"or "44" which indicates no ruled line drawn.

The ruled line information along the Y axis in the region Z1 is thus represented by "14, 14, 34, 00 or 11 or 44."

In this manner, numerical representations of the ruled line information along the X- and Y-axes in the regions Z2 through Z9 are also obtained.

These numerical representations of the ruled line information along the X- and Y-axes in the regions Z2 through Z9 are then converted into bar code information.

The bar code used may be of a known format such as ITF (Interleaved Format), a "2 of 5" format, or a CODE 39 format.

Figure 8:
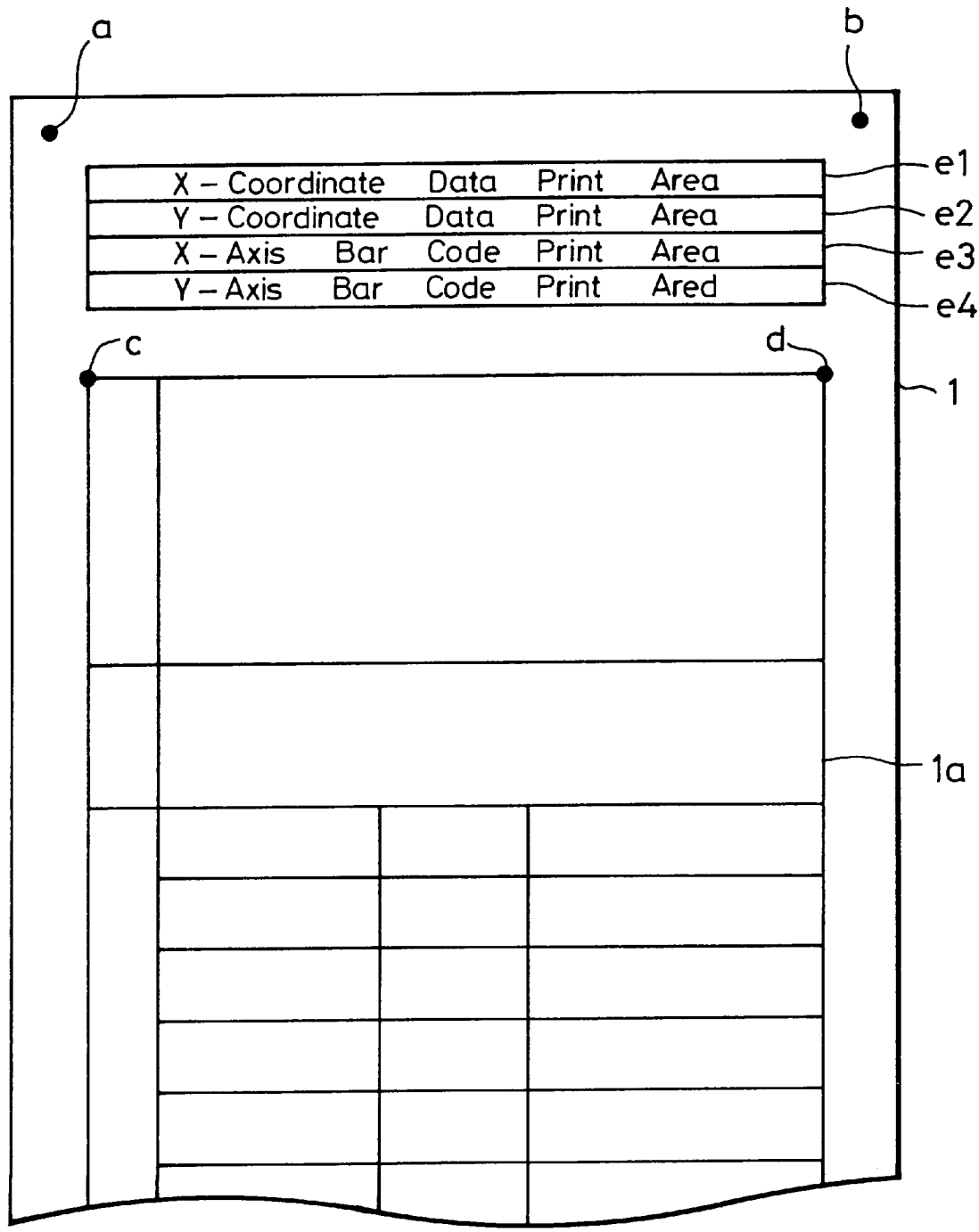
FIG. 8 is a view of a table sheet with a table printed thereon according to line mark information and bar code information.

The line mark information representing the ruled line information along the X- and Y-axes and the bar code information representing the ruled line information are printed as shown in FIG. 8.

More specifically, as shown in FIG. 8, the line marks as indicating the X-coordinate data are printed in an X-coordinate data print area e1 above the table 1a, the line marks as indicating the Y-coordinate data are compressed by 70%, for example, depending on the relationship between the vertical and horizontal dimensions of the table 1a, and printed in a Y-coordinate data print area e2 above the table 1a, the bar code as indicating the ruled line information along the X axis is printed in an X-axis bar code print area e3 above the table 1a, and the bar code as indicating the ruled line information along the Y axis is printed in a Y-axis bar code print area e4 above the table 1a.

Figure 6:
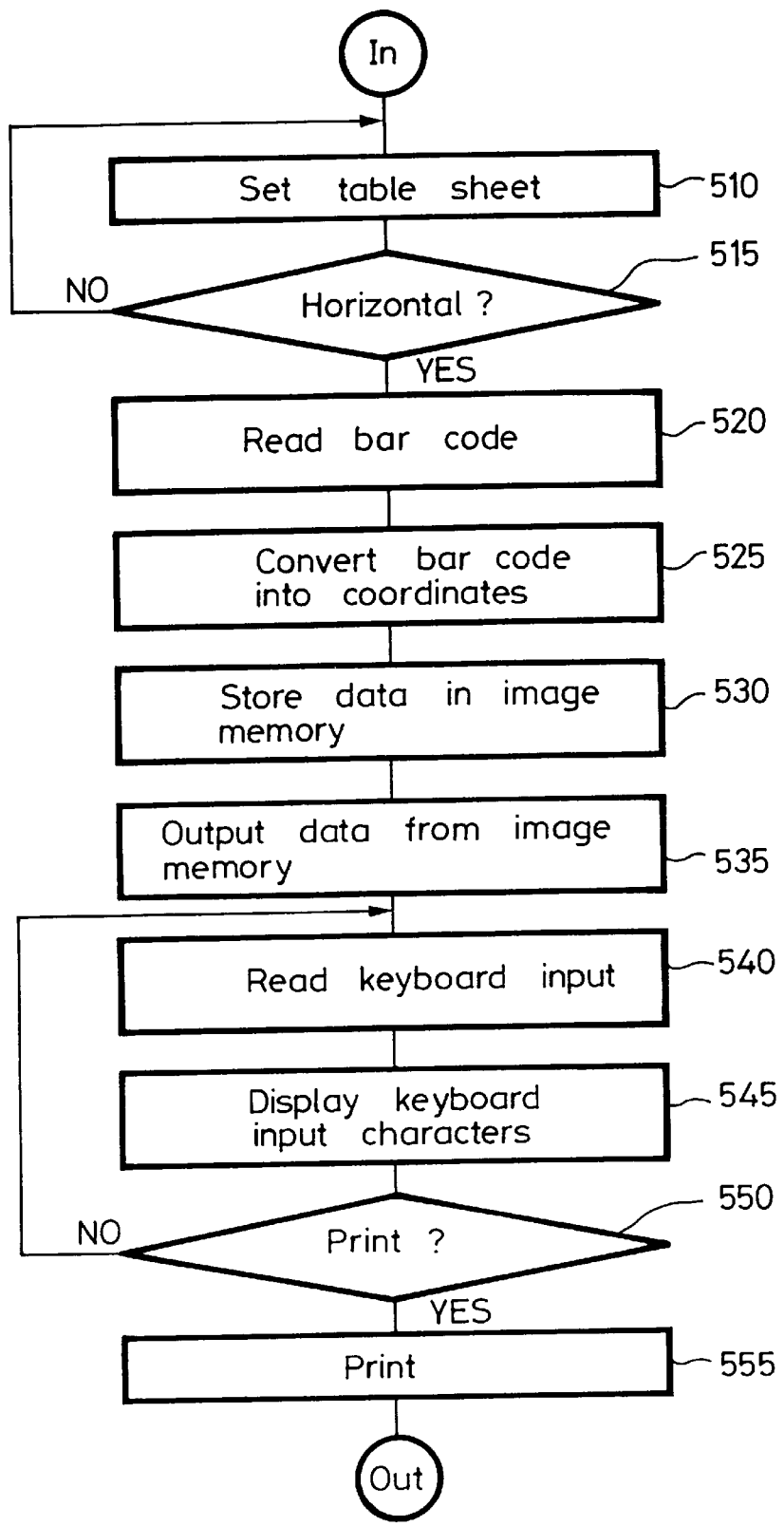
FIG. 6 is a flowchart of a further subroutine of the operation sequence.

The table 1a on the table sheet 1 printed with the bar codes and the coordinate data is used according to the subroutine S4 which is shown in FIG. 6.

The subroutine S4 will be described below with reference to FIG. 6.

The subroutine S4 serves to print desired data entered by the user through the keyboard 16 accurately in cells of the table 1a on the table sheet 1 that is printed with the bar codes and the coordinate data.

The user sets the table sheet 1 in the printer in a step 510. More specifically, the table sheet 1 as shown in FIG. 8 is inserted in the printer. Then, if the user wants to moves the position beam 9 manually, the user presses the Y-axis key (not shown) on the keyboard 16 to enable the driver 15 to energize the Y-axis motor 3 to rotate the rubber roller 2, and also presses the X-axis key (not shown) on the keyboard 16 to enable the driver 15 to energize the X-axis motor 4 to rotate the pulley 5 for thereby moving the position beam 9 until the spot of the position beam 9 is aligned with a lefthand reference point c on the table sheet 1 as shown in FIG. 8. Thereafter, the X-axis key on the keyboard 16 is pressed again to enable the driver 15 to energize the X-axis motor 4 to rotate the pulley 5 for moving the position beam 9 until the spot thereof is aligned with a righthand reference point b on the table sheet 1 as shown in FIG. 8.

Then, the CPU 10 determines whether the table sheet 1 is horizontal or not in a step 515. If horizontal, then control proceeds to a step 520. If not, then control goes back to the step 510. Specifically, if the spot of the position beam 9 is not aligned with the righthand reference point b, indicating that the table sheet 1 is not horizontal, then the CPU 10 controls the LCD unit 23 to display an error message indicating that the table sheet 1 is not set horizontally.

If the user wants to move the position beam 9 automatically, the user moves the position beam 9 until the spot of the position beam 9 is aligned with the lefthand reference point c on the table sheet 1, as described above. Thereafter, the user presses the return key (not shown) on the keyboard 16. The CPU 10 controls the driver 15 to energize the X-axis motor 4 to move the position beam 9 together with the recording head and ribbon assembly 8 to the right.

At the same time, the position beam 9 supplies an electric signal indicative of the reflected light to the position beam driver/bar code reader 14, and the coordinate data from the X-coordinate detector 17 is supplied to the CPU 10. The CPU 10 then determines whether the number of dots in the horizontal direction, i.e., X-axis direction, exceeds a predetermined number of dots or not, and also the reference point b is detected or not. If the reference point b is detected, the CPU 10 determines that the table sheet 1 is set horizontally. If the reference point b is not detected, the CPU 10 determines that the table sheet 1 is not set horizontally, and controls the LCD unit 23 to display an error message.

After the step 515, the CPU 10 reads the bar codes in a step 520. Specifically, the CPU 10 controls the driver 15 to energize the Y-axis motor 3 to position the spot of the position beam 9 in the leftmost end of the X-coordinate data print area e1 on the table sheet 1, which is located a certain number of dots below the reference point a. Then, the CPU 10 controls the driver 15 to energize the X-axis motor 4 to move the position beam 9 to the right. While the position beam 9 is moving to the right, the line marks printed in the X-coordinate data print area e1 are read by the position beam driver/bar code reader 14 through the position beam 9.

After the spot of the position beam 9 has reached the rightmost end of the X-coordinate data print area e1, the CPU 10 enables the driver 15 to energize the Y-axis motor 3 to position the spot of the position beam 9 in the rightmost end of the Y-coordinate data print area e2 which is located a certain number of dots below the X-coordinate data print area e1. Then, the CPU 10 controls the driver 15 to energize the X-axis motor 4 to move the position beam 9 to the left. While the position beam 9 is moving to the left, the line marks printed in the Y-coordinate data print area e2 are read by the position beam driver/bar code reader 14 through the position beam 9.

After the spot of the position beam 9 has reached the leftmost end of the Y-coordinate data print area e2, the CPU 10 enables the driver 15 to energize the Y-axis motor 3 to position the spot of the position beam 9 in the leftmost end of the X-axis bar code print area e3 which is located a certain number of dots below the Y-coordinate data print area e2. Then, the CPU 10 controls the driver 15 to energize the X-axis motor 4 to move the position beam 9 to the left. While the position beam 9 is moving to the left, the X-axis bar code printed in the X-axis bar code print area e3 is read by the position beam driver/bar code reader 14 through the position beam 9.

After the spot of the position beam 9 has reached the rightmost end of the X-axis bar code print area e3, the CPU 10 enables the driver 15 to energize the Y-axis motor 3 to position the spot of the position beam 9 in the rightmost end of the Y-axis bar code print area e4 which is located a certain number of dots below the X-axis bar code print area e3. Then, the CPU 10 controls the driver 15 to energize the X-axis motor 4 to move the position beam 9 to the left. While the position beam 9 is moving to the left, the Y-axis bar code printed in the Y-axis bar code print area e4 is read by the position beam driver/bar code reader 14 through the position beam 9.

The CPU 10 then converts the bar codes thus read into coordinates in a step 525. More specifically, the bar codes which are read by the position beam driver/bar code reader 14 are converted into coordinate information by the coordinate/bar code converter 10b of the CPU 10.

At the same time, the line marks read from the Y-coordinate data print area e2 are expanded to their original information length.

In a next step 530, the CPU 10 produces image data of the table 1a from the bar codes representing the ruled line information along the X- and Y-axes and the line marks representing the X- and Y-coordinate data, and stores the image data in the image memory 21.

In a step 535, the CPU 10 reads the image data from the image memory 21, and supplies the image data through the bus 11 and the LCD driver 22 to the LCD unit 23, which then displays the image of the table 1a on the screen.

In a step 540, the CPU 10 reads data, particularly character data, entered by the user through the keyboard 16, and stores the data in the image memory 21.

In a step 545, the entered character data is displayed on the screen of the LCD unit 23. Specifically, the entered characters are displayed in cells of the displayed table 1a which are defined by the ruled lines on the table sheet 1.

After an entry of character data has been made through the keyboard 16 and displayed on the LCD unit 23, the user may press the return key to move the cursor to a cell where a next entry is to be made.

Thereafter, the CPU 10 determines whether the entered data is to be printed or not in a step 550. If yes, then control proceeds to a step 555, and if not, then control goes back to the step 540. In the step 555, the entered data is printed in the table 1a on the table sheet 1 by the printer.

At this time, the position beam 9 is moved either by the user with the X- and Y-axis keys or automatically to position the spot of the position beam 9 at the leftmost starting point c in the table 1a as shown in FIG. 8.

In addition, the X-axis motor 4 may be energized by the CPU 10 through the driver 15, and the CPU 10 may confirm whether the table sheet 1 is horizontal or not.

More specifically, when the user has entered all desired data in corresponding cells of the table 1a or has pressed a key (not shown) on the keyboard 16 which indicates the end of the data entry, the LCD unit 23 displays a message asking if the user wants to print the data or not. If the user presses an execution key (not shown), for example, then the CPU 10 positions the spot of the position beam 9 at the leftmost starting point c. Thereafter, only the data entered by the user through the keyboard 16 is supplied from the image memory 21 either directly to the printer or to a print memory of the printer. The data entered by the user is then printed accurately in cells of the table 1 on the table sheet 1.

In this embodiment, as described above, an existing table 1a may be read as table data by the position beam 9 of the printer, or a table 1a may be read by the image input unit 19 or created using the keyboard 16, and the read or created table data is converted into code data which is stored. When the stored code data is subsequently read, the corresponding table 1a can be displayed on the LCD unit 23, and the user can enter desired data in the displayed table 1a. Thereafter, the entered data can be printed in cells of the table 1a. Since the entire data of the table 1a is not stored, the data storage is relatively inexpensive, and offers a wide variety of applications.

The X- and Y-coordinate data represented by the like marks as well as the bar codes are printed on the table sheet 1. The required amount of printed information is held to a minimum.

Figure 12:
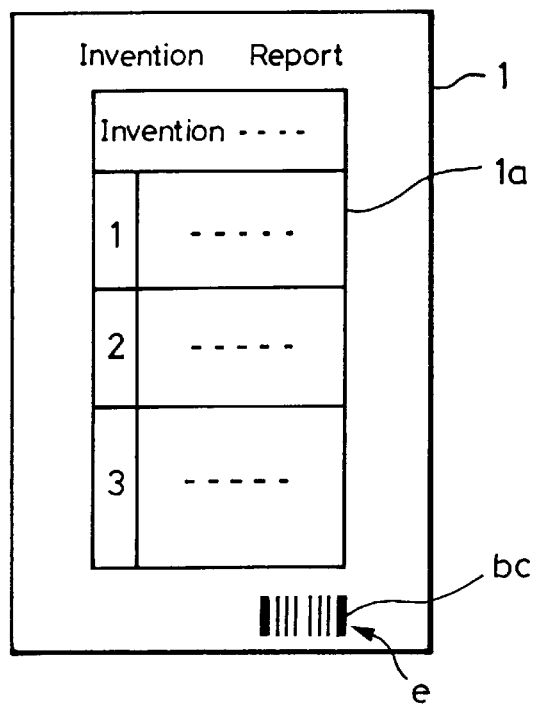
FIGS. 12 through 14 are views showing various examples printed by the ruled line generating apparatus according to the present invention.
Figure 13:
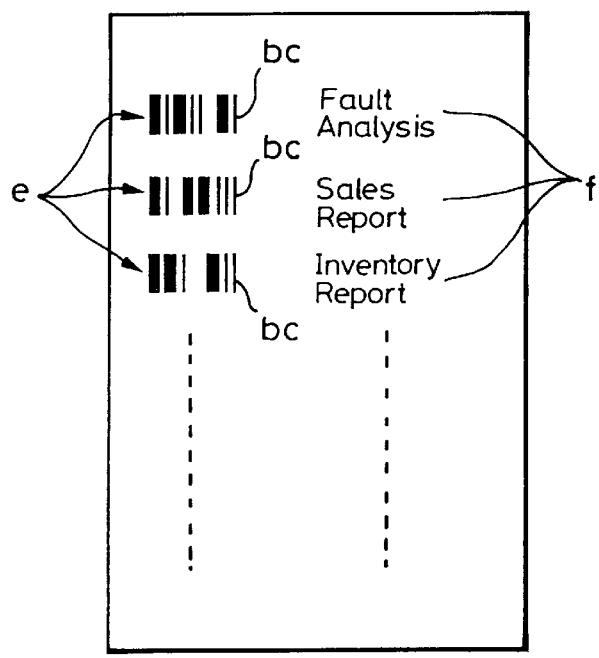
Figure 14:
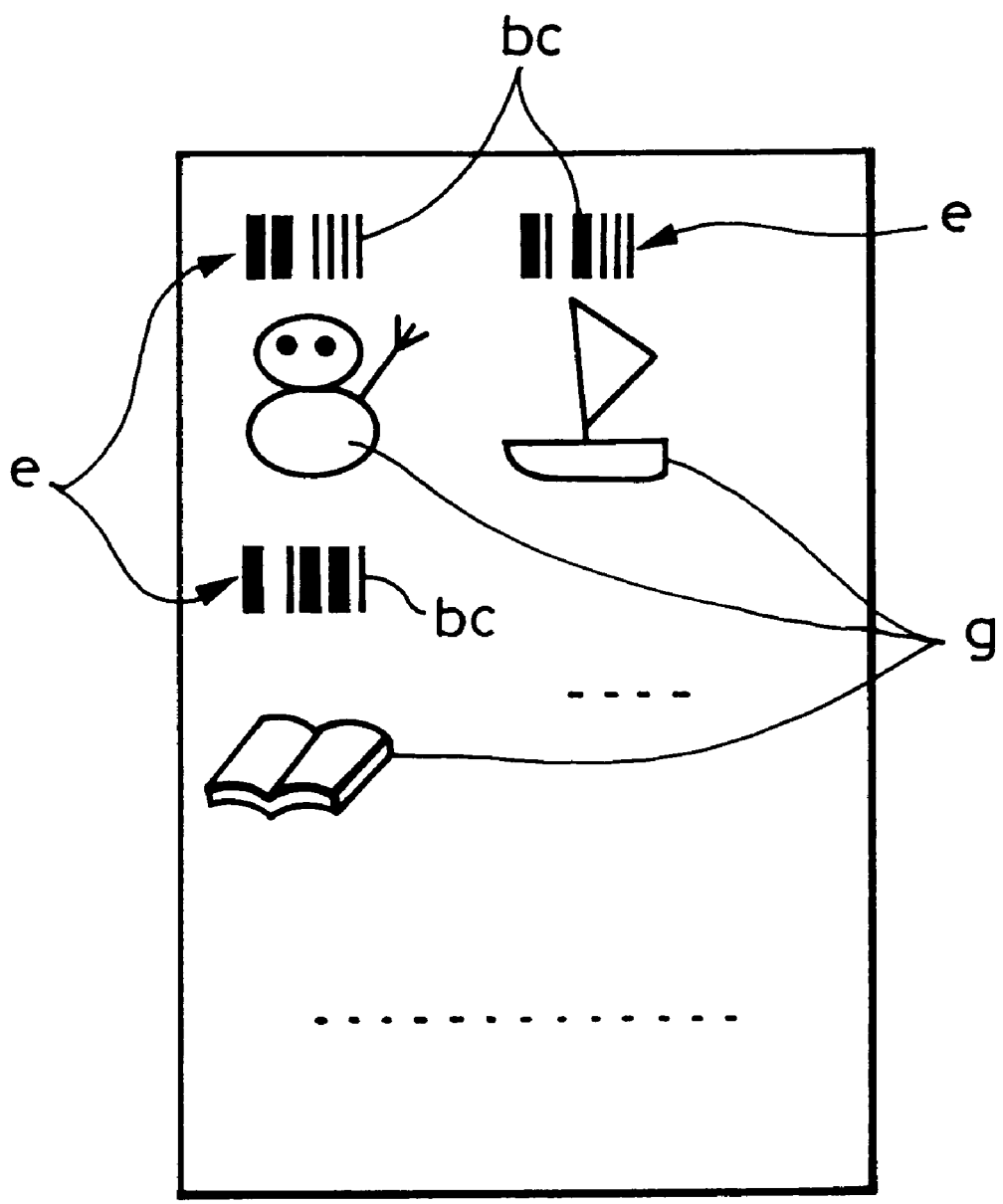

FIGS. 12 through 14 show various examples printed by the ruled line generating apparatus according to the present invention.

In FIG. 12, a bar code bc is printed in a bar code print area e below a table 1a on a table sheet 1.

In FIG. 13, table data of tables indicated by various different titles f on the righthand side are printed as bar codes bc on the lefthand side.

In FIG. 14, data of various illustrations g are converted into respective bar codes bc, and the bar codes bc are printed in respective bar code print areas e above the respective illustrations g.

In the examples shown in FIGS. 13 and 14, the data printed as bar codes are not required to be stored in a relatively expensive storage medium such as a floppy disk. Therefore, the data storage by way of bar codes is relatively inexpensive, and can find a wide variety of applications.

While bar codes have been shown and described as coded table information, any of various other codes that can be read may be used as coded table information.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. A bar code converting apparatus comprising:

reading means for reading table information off of a sheet having a table printed thereon, said table information including positions and lengths of ruled lines in said table; and bar code converting means for converting the table information read by said reading means into a bar code.

2. A bar code converting apparatus according to claim 1, wherein said reading means comprises a light-emitting element for applying light to the sheet to confirm a print starting position on the sheet.

3. A bar code converting apparatus according to claim 1 or 2, further comprising printing means for printing the bar code converted from the table information.

4. A bar code converting apparatus comprising:

a scanner for reading table information off of an existing table sheet having a table printed thereon, said table information including positions and lengths of ruled lines in said table;

information and image memories for storing the table information read by said scanner;

display means for displaying an image representing said ruled lines of the table information read from said image memory;

bar code converting means for converting the table information read by said scanner into a bar code; and printing means for printing the bar code converted from the table information by said bar code converting means.

5. A bar code converting apparatus, comprising:

a keyboard for entering table information, said table information including positions and lengths of ruled lines in a table;

processing means for processing the table information entered through said keyboard;

display means for displaying the table information processed by said processing means; and converting means for converting said table information displayed on a display screen of said display means into a bar code.

6. A bar code converting apparatus according to claim 5, further comprising an image memory for storing the table information displayed on said display means.

7. A bar code converting apparatus according to claim 5 or 6, further comprising printing means for printing the bar code converted from the table information by said converting means.

8. A coding apparatus comprising:

memory means for storing table information;

detecting means for detecting from said table information positions and lengths of ruled lines in respective directions of a table represented by said table information stored in said memory means;

dividing means for dividing the table information into a plurality of areas based on the detected positions of the ruled lines; and converting means for generating coded information on the ruled lines based on the table information divided into a plurality of areas from said dividing means and the detected positions and lengths from said detecting means.

9. A coding apparatus according to claim 8, wherein said coded information comprises line mark information representing X-coordinate data, line mark information representing Y-coordinate data, a bar code representing X-axis ruled line information, and a bar code representing Y-axis ruled line information.

10. A table information generating apparatus comprising:
   memory means for storing table information;
   detecting means for detecting from said table information positions and lengths of ruled lines in respective directions of a table represented by said table information stored in said memory means;
   dividing means for dividing the table information into a plurality of areas based on the detected positions of the ruled lines;
   converting means for generating coded information on the ruled lines based on the table information divided into a plurality of areas from said dividing means and the detected positions and lengths from said detecting means, and converting the coded information of the ruled lines into ruled line information of the ruled lines; and
   table information generating means for generating table information based on the ruled line information of the ruled lines from said converting means and the divided table information from said dividing means.

11. A table sheet printed with a table having ruled lines which is produced by an apparatus comprising memory means for storing table information, detecting means for detecting from said table information positions and lengths of said ruled lines in respective directions of a table represented by said table information stored in said memory means, dividing means for dividing the table information into a plurality of areas based on the detected positions of the ruled lines, and converting means for generating coded information on the ruled lines based on the divided table information divided into a plurality of areas from said dividing means and the detected positions and lengths from said detecting means.

* * * * *